United States Patent
Alshammery et al.

(10) Patent No.: US 11,914,099 B2
(45) Date of Patent: Feb. 27, 2024

(54) AUTOMATIC GEOLOGICAL FORMATIONS TOPS PICKING USING DYNAMIC TIME WARPING (DTW)

(71) Applicant: Saudi Arabian Oil Company, Dhahran (SA)

(72) Inventors: Matter J. Alshammery, Dhahran (SA); Nazih F. Najjar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 666 days.

(21) Appl. No.: 16/671,516

(22) Filed: Nov. 1, 2019

(65) Prior Publication Data

US 2021/0132253 A1     May 6, 2021

(51) Int. Cl.
*G01V 5/12* (2006.01)
*G06F 16/11* (2019.01)
*G06F 16/18* (2019.01)
*E21B 49/00* (2006.01)

(52) U.S. Cl.
CPC .............. *G01V 5/12* (2013.01); *E21B 49/003* (2013.01); *G06F 16/116* (2019.01); *G06F 16/1805* (2019.01)

(58) Field of Classification Search
CPC ..... G06F 16/116; G06F 16/1805; G01V 5/12; E21B 49/003
USPC ................................... 707/830; 703/6; 702/6
See application file for complete search history.

(56) References Cited

U.S. PATENT DOCUMENTS

| | | | |
|---|---|---|---|
| 2002/0184024 A1* | 12/2002 | Rorex | G10L 15/28 704/E15.046 |
| 2014/0316706 A1 | 10/2014 | Grant et al. | |
| 2015/0088424 A1* | 3/2015 | Burlakov | G01V 99/00 702/6 |

(Continued)

FOREIGN PATENT DOCUMENTS

| | | | | |
|---|---|---|---|---|
| AU | 2014253924 A1 * | 11/2015 | ............. | G01V 1/362 |
| CA | 3000537 A1 * | 10/2018 | ............. | G01V 1/362 |

(Continued)

OTHER PUBLICATIONS

An et al, "A Grid-based Index Method for Time Warping Distance," LNCS, vol. 3129, 2004, pp. 65-75, 11 pages.

(Continued)

*Primary Examiner* — Giovanna B Colan
(74) *Attorney, Agent, or Firm* — Fish & Richardson P.C.

(57) ABSTRACT

Systems and methods include a method for predicting geological formation tops. First well log data associated with a key master well is received. Formation data identifying tops of formations confirmed in the key master well is received. Merged key master well and formation data is generated in a dynamic time warping (DTW)-readable format by merging the first well log data with the formation data. Second well log data associated with a training well located in geographic proximity to the key master well is received. The second well log data is formatted into the DTW-readable format. A DTW function is executed to generate indices associated with the formation tops. The DTW function uses the merged key master well and formation data and the formatted second well log data as DTW function inputs. Predicted geological formation tops for the training well are predicted using the generated indexes.

20 Claims, 5 Drawing Sheets

(56) References Cited

U.S. PATENT DOCUMENTS

2021/0102457 A1\* 4/2021 Dupont .................... G01V 1/50

FOREIGN PATENT DOCUMENTS

| CN | 106529595 | A | \* | 3/2017 | ........... G06K 9/6222 |
|---|---|---|---|---|---|
| CN | 106778824 | A | \* | 5/2017 | ........... G06K 9/6223 |
| CN | 106610505 | B | \* | 3/2019 | ............. G01V 1/282 |
| JP | 7162075 | B2 | \* | 10/2022 | ........... G05B 13/042 |
| WO | WO 2019204555 | | | 10/2019 | |
| WO | WO-2019204555 | A1 | \* | 10/2019 | ............. E21B 47/04 |

OTHER PUBLICATIONS

Mueen et al, "Extracting Optimal Performance from Dynamic Time Warping," 22nd ACM SIGKDD Conference on Knowledge Discovery and Data Mining, Aug. 13-17, 2016, San Francisco, 123 pages.

PCT International Search Report and Written Opinion in International Appln. No. PCT/US2020/058183, dated Feb. 16, 2021, 15 pages.

GCC Examination Report in GCC Appln. No. GC 2020-40784, dated Sep. 30, 2021, 4 pages.

\* cited by examiner

AUTOMATIC GEOLOGICAL FORMATIONS TOPS PICKING USING DYNAMIC TIME WARPING (DTW)

BACKGROUND

The present disclosure applies identifying geological formations in wells, such as oil and gas wells. Geological formations can include formations that include a certain about of comparable rock strata, for example. In hydrocarbon exploration and reservoir characterization, log correlation between wells can be used to develop subsurface structural and stratigraphic framework models. In conventional processes, geological formations can be identified in various ways, such as manually by geoscientists. The processes can involve formation top picking to connect equivalent geologic horizons or surfaces (such as isopach, facies, and geological sequences) between wells. Information identifying these surfaces can be used in prospecting, reservoir studies, and 3D geological modeling.

SUMMARY

The present disclosure describes techniques that can be used for automatically picking (or predicting) geological formation tops in wells using well logs and a dynamic time warping (DTW) function. In some implementations, a computer-implemented method includes the following. First well log data associated with a key master well is received. Formation data identifying tops of formations confirmed in the key master well is received. Merged key master well and formation data is generated in a dynamic time warping (DTW)-readable format by merging the first well log data with the formation data. Second well log data associated with a training well located in geographic proximity to the key master well is received. The second well log data is formatted into the DTW-readable format. A DTW function is executed to generate indices associated with the formation tops. The DTW function uses the merged key master well and formation data and the formatted second well log data as DTW function inputs. Predicted geological formation tops for the training well are predicted using the generated indexes.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, the use of DTW techniques can reduce cycle-times, improve accuracy, and improve the quality of formation tops picking in wells. Second, automatic DTW processes can replace manual processes of picking well tops (which can be time-consuming and require high-level geological expertise). Third, automatic DTW processes can enhance the flow of required data used for prospecting, reservoir characterization studies, and three dimensional (3D) reservoir modeling, saving manpower recourses while improving well log correlation quality. Fourth, computer applications based on DTW techniques can be developed that automatically pick (and re-pick) formation tops for different exploration and field development in-fill wells. Fifth, the DTW techniques can be based on real-time data used to update 3D reservoir earth models. Sixth, the DTW techniques can be applied to multiple (for example, thousands of) wells at the same time, which positively impact oil and gas exploration and development projects, from prospecting to reservoir characterization and 3D geological modeling. Seventh, the DTW techniques can save time at the organizational level, improve quality at the corporate database level (for example, in well databases), and optimize manpower contribution (enabling reallocation to higher-priority activities). For example, optimizing manpower contribution can refer to achieving manpower productivity values that indicate or result in a performance greater than a predefined threshold. Eighth, the DTW techniques can improve correlation matches between key master wells and training wells.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for automatically picking geological formation tops in wells using well logs and a dynamic time warping (DTW) function. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, workflows for automatically picking (or identifying) geological formation tops in wells in which the workflows use wells logs and DTW functions can be implemented as program source code. The source code can be deployed at oil and gas facilities, central facilities (for example, in communication with wells for acquiring data, performing analysis, and providing communications), or some combination. In some implementations, the source code can perform the following main functions. First, training wells can be correlated with a nearby key master well for automatically picking formation tops. For example, pattern recognition, when applied to well logs, can be used as a primary technique for developing automation processes. Second, a key master well can be used for providing associated interpretations of geological events (for example, using information about formation tops that have been properly correlated). The automated processes can use well logs, such as gamma ray (GR) logs. Additionally, a training well with a GR log can be provided. DTW algorithms can be used to generate a model that approximates the best possible patterns that correlate and match the GR log of the key master well and the training wells. Third, based on the resultant model, accurate geological formation tops for the training well can be automatically generated.

Figure 1:
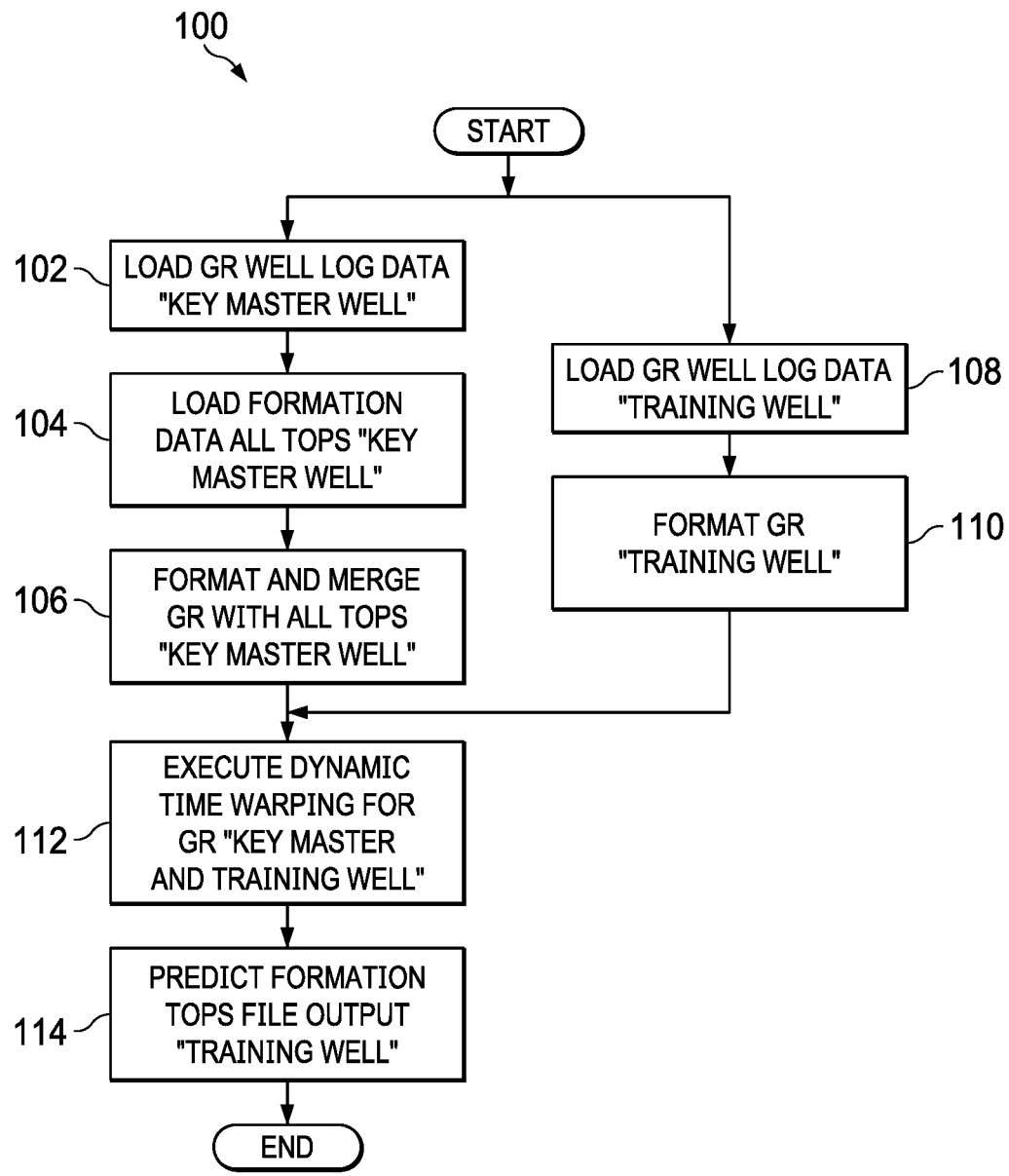
FIG. 1 is a flow diagram of an example of a workflow for automatically picking geological formation tops in well logs using a dynamic time warping (DTW) function, according to some implementations of the present disclosure.

An optimum alignment for a specific layer identifying a formation can be difficult to achieve between two well logs. The difficulty is due, at least in part, to varying thickness values in different wells, making it difficult to find similarities when correlating well logs. In the workflow of FIG. 1, the DTW function can compute (for example, with an accuracy of 97% or greater) an optimal alignment of GR logs between a master key well and a training well. In some implementations, the optimal alignment can be computed using a DTW function to match the well logs' peaks and troughs through an iterative process of well log squeezing and stretching (or condensing and de-condensing). In this way, the DTW function can model indices from the master key well to indices from the training well to return and predict formation tops.

FIG. 1 is a flow diagram of an example of a workflow 100 for automatically picking geological formation tops in well logs using a DTW function, according to some implementations of the present disclosure. At 102, GR well log data for a key master well is loaded. At 104, formation data for all tops of the key master well is loaded. At 106, GR well log data for the key master well is formatted and merged with the data for the tops. At the same time that steps 102, 104, and 106 occur, steps 108 and 110 can occur. At 108, GR well log data for the training well is loaded. At 110, GR well log data for the training well is formatted. At 112, dynamic time warping is executed for the data associated with the key master well and the training well. At 114, formation tops are predicted for the training well. For example, the predictions can be output to a file.

Figure 2:
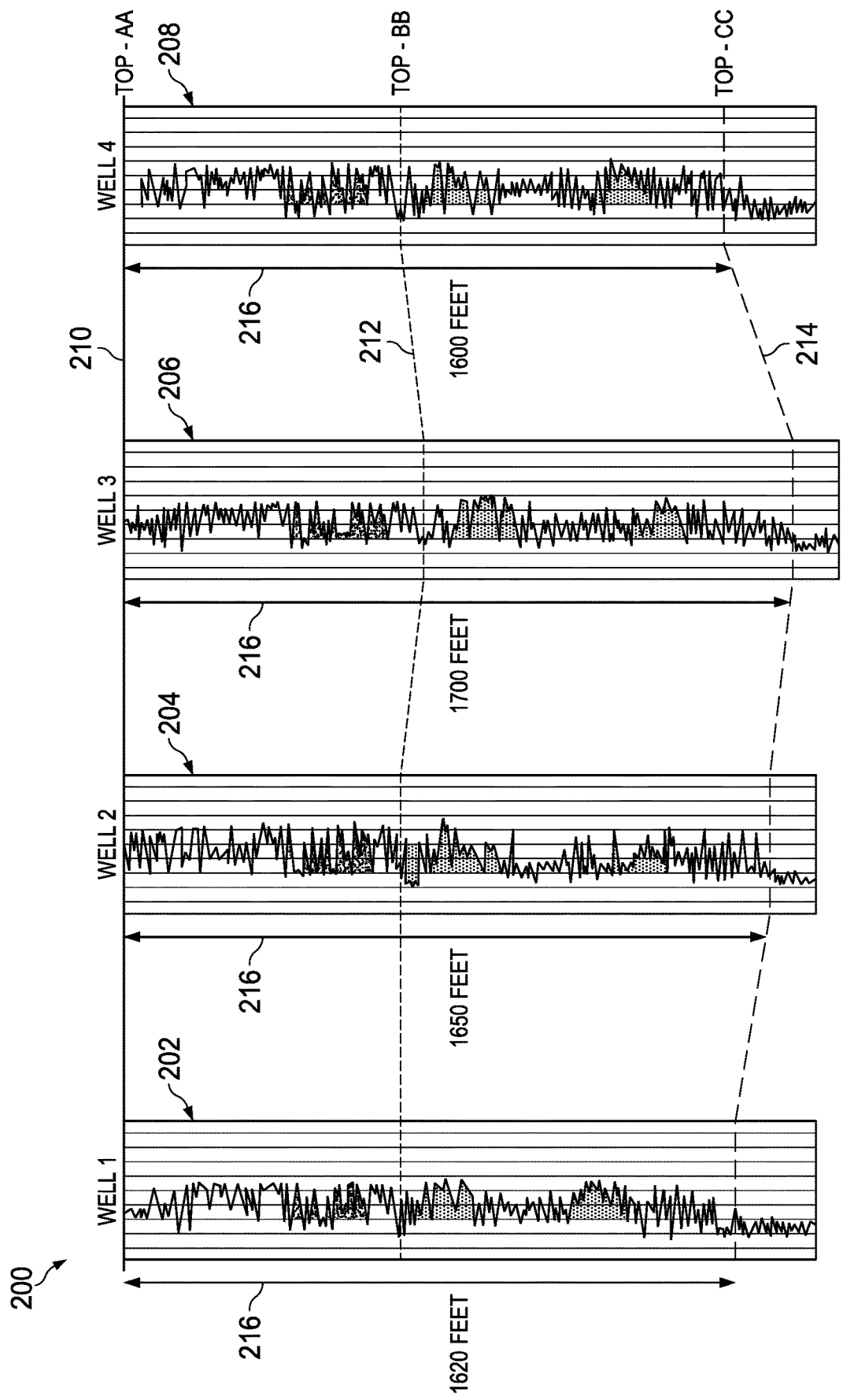
FIG. 2 is a diagram showing an example of a well log correlation for use in developing subsurface structural and stratigraphic framework models, according to some implementations of the present disclosure.

FIG. 2 is a diagram showing an example of a well log correlation 200 for use in developing subsurface structural and stratigraphic framework models, according to some implementations of the present disclosure. For example, the correlation 200 can correlate top locations relative to different depths in plots 202, 204, 206, and 208, for Wells 1, 2, 3, and 4, respectively. A depth correlation line 210 correlates depth locations of the wells represented in the plots 202, 204, 206, and 208. The depth correlation line 210 identifies a first top ("TOP-AA"). At a deeper depth (and different depths in the wells), a depth correlation line 212 identifies a second top ("TOP-BB"). At a yet deeper depth, a depth correlation line 214 identifies a third top ("TOP-CC"). Elevation markings 216 indicate that the third top occurs at depths of 1620, 1650, 1700, and 1600 feet, respectively, for wells 1, 2, 3, and 4.

In some implementations, various techniques can be used to improve the results of correlating well logs, including recognizing patterns and similarities in well logs. For example, when correlating well logs, well depths and log values can be normalized so that a same sampling scale applies. Data cleaning and editing can also be used before automatic formation tops picking occurs, so as to more accurately predict the tops in wells. In addition, the shallowest formation top (for example, as indicated by the depth correlation line 210 in FIG. 2) in the key master well and the training well can be identified before continuing the downhole correlation process. Identifying the shallowest formation top can make it easier to perform auto picking for multiple formation tops, one at a time.

Figure 3:
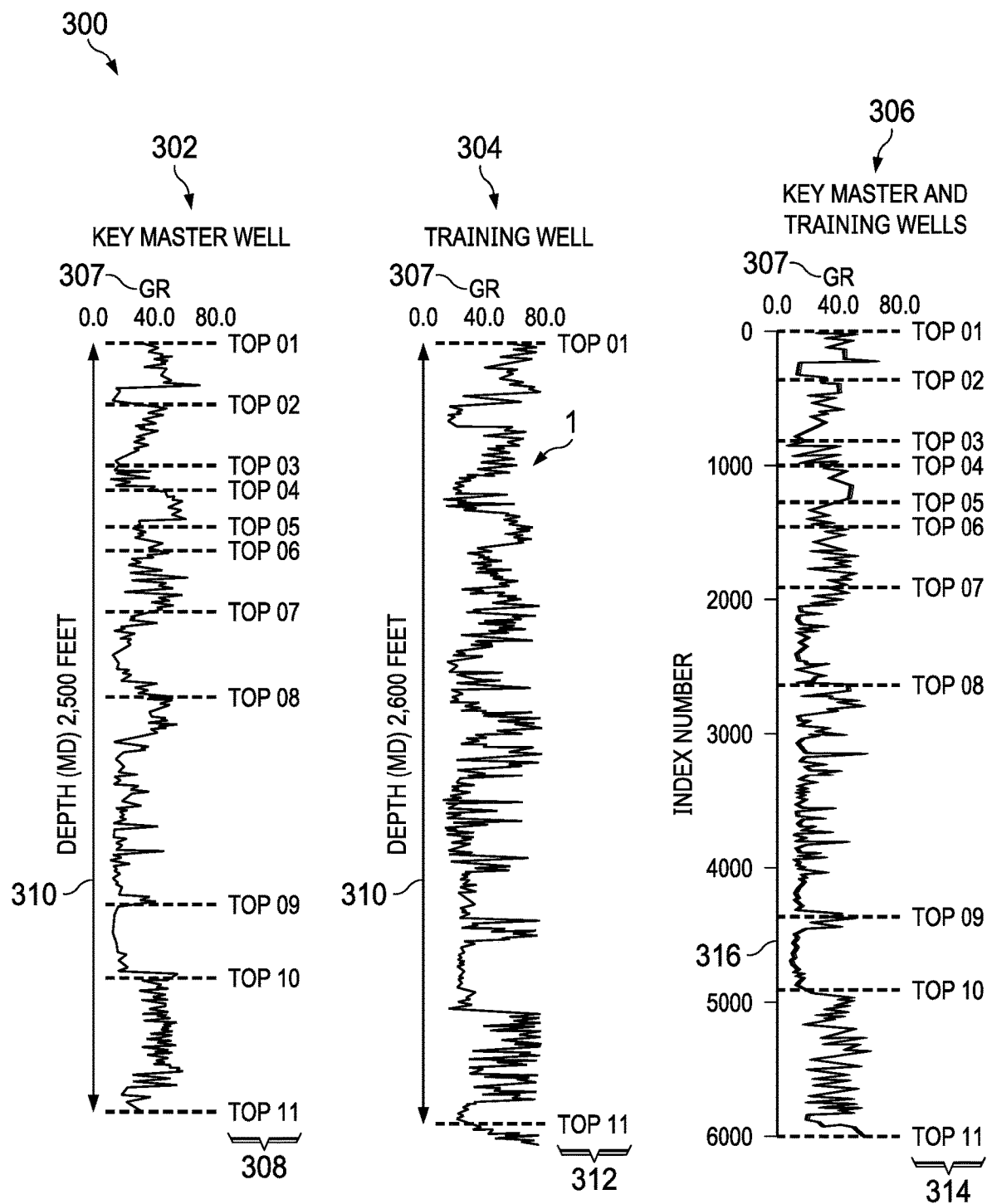
FIG. 3 shows example plots associated with a DTW function, according to some implementations of the present disclosure.

FIG. 3 shows example plots 300 associated with a DTW function, according to some implementations of the present disclosure. For example, the plots include a key master well plot 302, a training well plot 304, and a combined plot 306 combining data from the key master well and the training wells. The combined plot 306 can result, for example, from the DTW function computing an optimal alignment of GR logs aligned between the master key well and the training well. The optimal alignment can be computed by matching peaks and troughs through a process of squeezing and stretching well logs. The combined plot 306 (and other outputs of the DTW function) can be used to predict formation tops. In some implementations, the workflow 100 can be used to generate the combined plot 306. Plots 302, 304, and 306 are plotted relative to a GR scale 307, for example, in American Petroleum Institute (API) units.

The key master well plot 302 shows locations (indicated by dashed lines) of eleven tops 308 at different depths 310 (for example, in feet). The training well plot 304 shows locations of two tops 312 having a least depth ("Top 01") and a greatest depth ("Top 11"). The DTW function can use the depths 310 of the tops associated with the key master well plot 302 and the training well plot 304 to generate the combined plot 306. As a result, tops 314 (indicated by dashed lines) in the combined plot 306 are located at specific depths relative to an index number 316.

In some implementations, application code (or program source code) such as the following example, can be used to implement the DTW function:

```
%----------------------------------------------------------------
%    Automatic Formation Tops Picking Using DTW in computer Language
%----------------------------------------------------------------
clear all;
close all;
%----------------------------------------------------------------
```

```
%       Read log Data from Processed Files
%------------------------------------------------
well1 = csvread('.\wlog01.txt');
well2 = csvread('.\wlog02.txt');
%------------------------------------------------
%       Execute Dynamic Time Warping for GR
%------------------------------------------------
dtw(well1(:,2),well2(:,2));
[dist,well1_dtw,well2_dtw] = dtw(well1(:,2),well2(:,2),108);
%------------------------------------------------
%       Match Correlation & Predict Formation Tops
%------------------------------------------------
picks1_dtw=well1(well1_dtw,3);
indices=find(picks1_dtw>0);
values=picks1_dtw(picks1_dtw>0);
picks2_extract=zeros(size(well2(:,1)));
picks2_extract(well2_dtw(indices))=values;
picks1_size=well1(:,3);
picks1_size=size(picks1_size(picks1_size>0));
picks1_size=picks1_size(1);
picks2_prediction = zeros(picks1_size,2);
for i=1:picks1_size
        picks_indices=find(picks2_extract==i);
        if(size(picks_indices)>=1)
           picks2_prediction(i,1)=i;
           picks2_prediction(i,2)=well2(picks_indices(1),1);
        end
end
%------------------------------------------------
% Output Results To Excel file
%------------------------------------------------
delete '.\predicted.xls'
xlswrite('.\predicted.xls',picks2_prediction);
% print
fprintf('Pick-ID:,Prediction\n');
for i=1:picks1_size
        fprintf('%d,%.2f\n',i,picks2_prediction(i,2));
end
%--------------------End-----------------------
```

Figure 4:
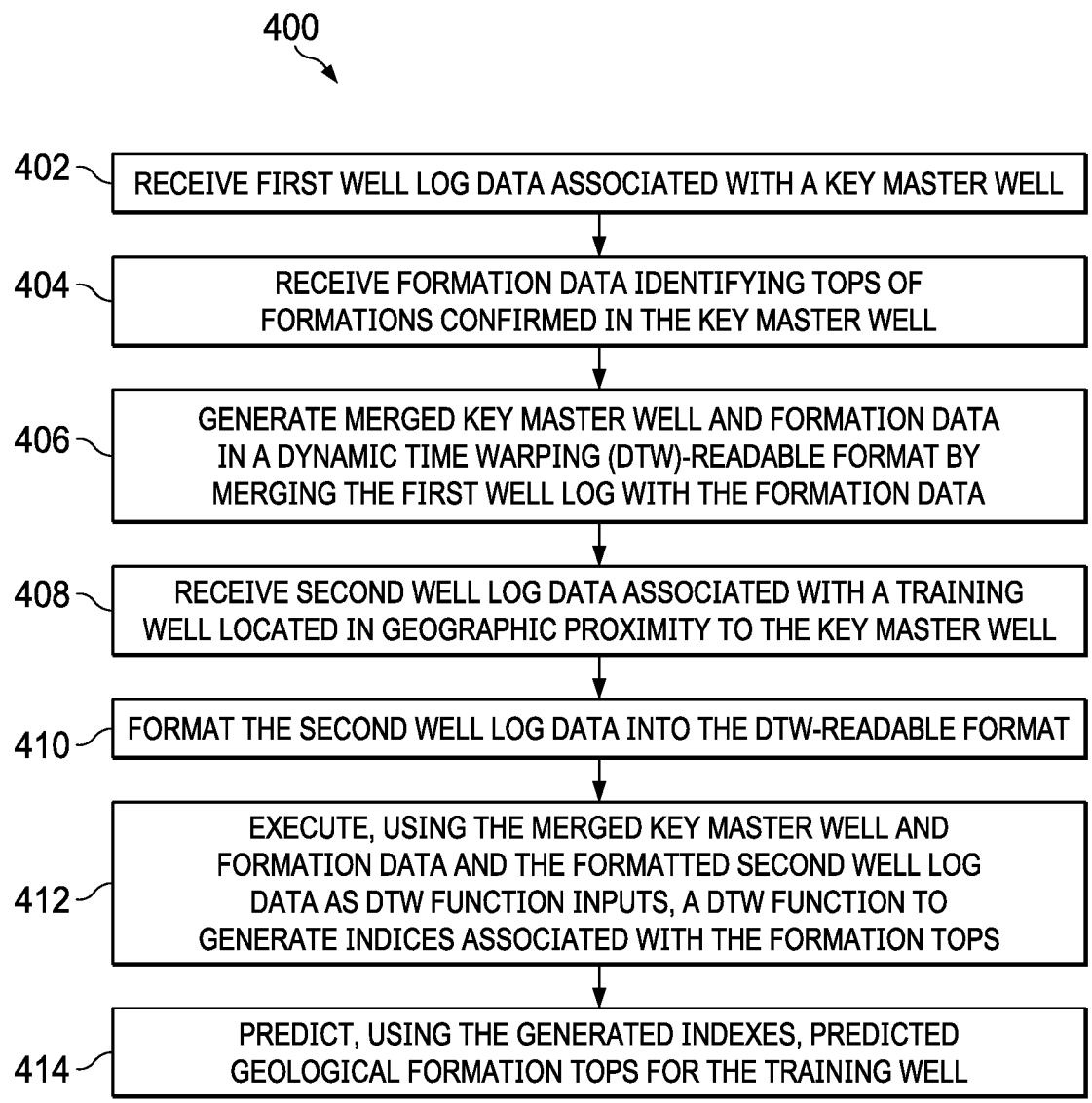
FIG. 4 is a flowchart of an example method for using well log data and a DTW function to predict geological formation tops, according to some implementations of the present disclosure.

FIG. 4 is a flowchart of an example method 400 for using well log data and a DTW function to predict geological formation tops, according to some implementations of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order.

At 402, first well log data associated with a key master well is received. For example, the first well log data can be included in a GR log that includes GR readings (for example, in API units) collected at a sequence of different depths. The well log can be a text file, for example. From 402, method 400 proceeds to 404.

At 404, formation data identifying tops of formations confirmed in the key master well is received. The identified tops can identify the tops of different types of geological formations, for example. From 404, method 400 proceeds to 406.

At 406, merged key master well and formation data is generated in a DTW-readable format by merging the first well log data with the formation data. For example, a merging operation can read data entries in the two well logs and create entries that are compatible with the DTW function. The two well logs can include data entries having different depth intervals, for example, where the collection of the entries can also correspond to different ranges of depths. The DTW function-compatible entries can include numerical indices, for example, that allow each entire well log to be compressed and decompressed as needed to match peaks and troughs of another well log of a different well. From 406, method 400 proceeds to 408.

At 408, second well log data associated with a training well located in geographic proximity to the key master well is received. For example, the second well log data can be included in a GR log that includes GR readings (for example, in API units) collected at a sequence of different depths. The well log can be a text file, for example. From 408, method 400 proceeds to 410.

At 410, the second well log data is formatted into the DTW-readable format. For example, data entries in the second well log data can be used to create data entries that are compatible with the DTW function. From 410, method 400 proceeds to 412.

At 412, a DTW function is executed to generate indices associated with the formation tops. The DTW function uses the merged key master well and formation data and the formatted second well log data as DTW function inputs. For example, executing the DTW function can include determining an optimal alignment of the first well log data and second well log data, such as to match formation tops. The optimal alignment can identify the tops 314 (indicated by dashed lines) in the combined plot 306 located at specific depths relative to the index number 316. From 412, method 400 proceeds to 412.

At 414, predicted geological formation tops for the training well are predicted using the generated indexes. In some implementations, the predictions can be included in a spreadsheet file that is output by the DTW function. After 414, method 400 can stop.

In some implementations, the predictions can be output to a data base. In some implementations, method 400 can further include reading the predicted geological formation tops from the file (for example, the data base), and refining previously-interpreted geological formation tops in existing wells using the predicted geological formation tops. Refining can include, for example, adjusting and saving the data identifying the locations of the geological formation tops. In some implementations, the predicted geological formation tops can be used for well geo-steering, 2-dimensional (2D) structural maps updates, and local 3-dimensional (3D) geological models updates including modeling-while-drilling.

Figure 5:
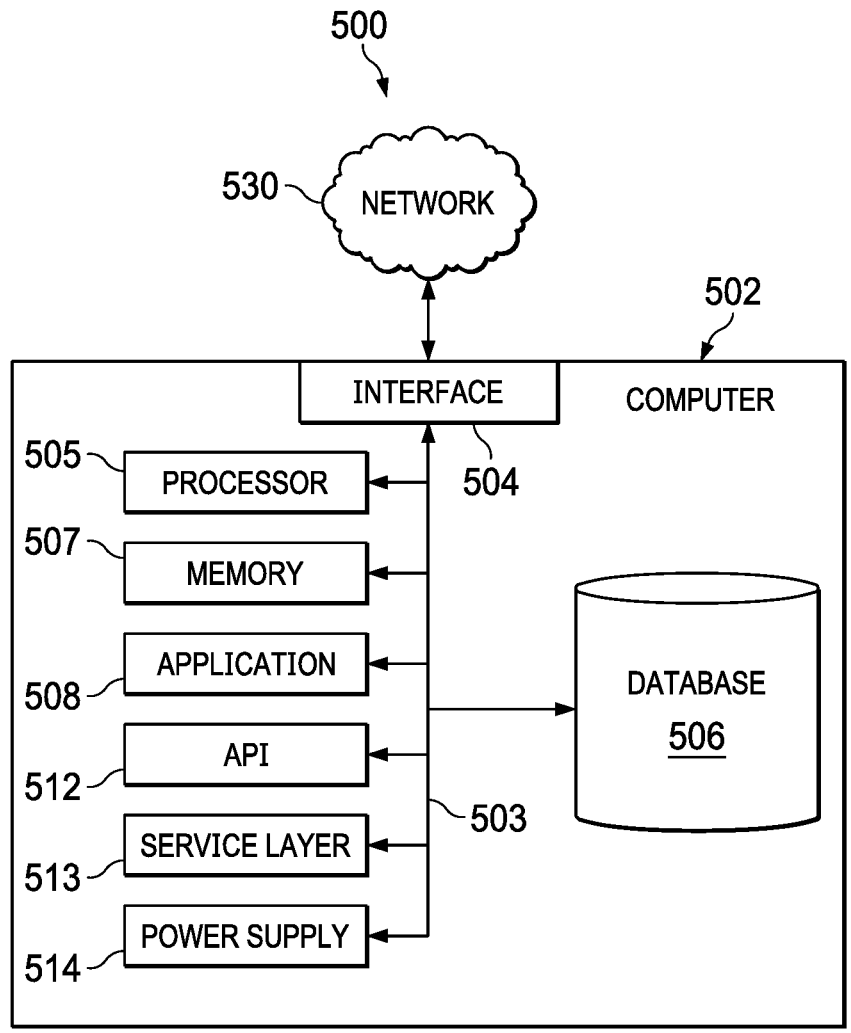
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an API 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes the following. First well log data associated with a key master well is received. Formation data identifying tops of formations confirmed in the key master well is received. Merged key master well and formation data is generated in a dynamic time warping (DTW)-readable format by merging the first well log data with the formation data. Second well log data associated with a training well located in geographic proximity to the key master well is received. The second well log data is formatted into the DTW-readable format. A DTW function is executed to generate indices associated with the formation tops. The DTW function uses the merged key master well and formation data and the formatted second well log data as DTW function inputs. Predicted geological formation tops for the training well are predicted using the generated indexes.

The foregoing and other described implementations can each, optionally, include one or more of the following features:

A first feature, combinable with any of the following features, the method further including outputting the predicted geological formation tops to a file.

A second feature, combinable with any of the previous or following features, where one or both of the first well log data and the second well log data is gamma ray (GR) well log data.

A third feature, combinable with any of the previous or following features, where log files containing the first well log data and the second well log data include entries recorded at depth intervals, and wherein the entries include, at a particular depth, a depth identifier, a resistivity L, a resistivity S, and a spontaneous potential.

A fourth feature, combinable with any of the previous or following features, where executing the DTW function includes determining an optimal alignment of the first well log data and second well log data.

A fifth feature, combinable with any of the previous or following features, where determining the optimal alignment including using an iterative process of well log condensing and de-condensing to match peaks and troughs in the first well log data and second well log data.

A sixth feature, combinable with any of the previous or following features, the method further including: reading the predicted geological formation tops from the file; and refining, using the predicted geological formation tops, previously-interpreted geological formation tops in existing wells.

In a second implementation, a non-transitory, computer-readable medium storing one or more instructions executable by a computer system to perform operations including the following. First well log data associated with a key master well is received. Formation data identifying tops of formations confirmed in the key master well is received. Merged key master well and formation data is generated in a dynamic time warping (DTW)-readable format by merging the first well log data with the formation data. Second well log data associated with a training well located in geographic proximity to the key master well is received. The second well log data is formatted into the DTW-readable format. A DTW function is executed to generate indices associated with the formation tops. The DTW function uses the merged key master well and formation data and the formatted second well log data as DTW function inputs. Predicted geological formation tops for the training well are predicted using the generated indexes.

The foregoing and other described implementations can each, optionally, include one or more of the following features:

A first feature, combinable with any of the following features, the operations further including outputting the predicted geological formation tops to a file.

A second feature, combinable with any of the previous or following features, where one or both of the first well log data and the second well log data is gamma ray (GR) well log data.

A third feature, combinable with any of the previous or following features, where log files containing the first well log data and the second well log data include entries recorded at depth intervals, and wherein the entries include, at a particular depth, a depth identifier, a resistivity L, a resistivity S, and a spontaneous potential.

A fourth feature, combinable with any of the previous or following features, where executing the DTW function includes determining an optimal alignment of the first well log data and second well log data.

A fifth feature, combinable with any of the previous or following features, where determining the optimal alignment including using an iterative process of well log condensing and de-condensing to match peaks and troughs in the first well log data and second well log data.

A sixth feature, combinable with any of the previous or following features, the operations further including: reading the predicted geological formation tops from the file; and refining, using the predicted geological formation tops, previously-interpreted geological formation tops in existing wells.

In a third implementation, a computer-implemented system, including one or more processors and a non-transitory computer-readable storage medium coupled to the one or more processors and storing programming instructions for execution by the one or more processors, the programming instructions instructing the one or more processors to perform operations including the following. First well log data associated with a key master well is received. Formation data identifying tops of formations confirmed in the key master well is received. Merged key master well and formation data is generated in a dynamic time warping (DTW)-readable format by merging the first well log data with the formation data. Second well log data associated with a training well located in geographic proximity to the key master well is received. The second well log data is formatted into the DTW-readable format. A DTW function is executed to generate indices associated with the formation tops. The DTW function uses the merged key master well and formation data and the formatted second well log data as DTW function inputs. Predicted geological formation tops for the training well are predicted using the generated indexes.

The foregoing and other described implementations can each, optionally, include one or more of the following features:

A first feature, combinable with any of the following features, the operations further including outputting the predicted geological formation tops to a file.

A second feature, combinable with any of the previous or following features, where one or both of the first well log data and the second well log data is gamma ray (GR) well log data.

A third feature, combinable with any of the previous or following features, where log files containing the first well log data and the second well log data include entries recorded at depth intervals, and wherein the entries include, at a particular depth, a depth identifier, a resistivity L, a resistivity S, and a spontaneous potential.

A fourth feature, combinable with any of the previous or following features, where executing the DTW function includes determining an optimal alignment of the first well log data and second well log data.

A fifth feature, combinable with any of the previous or following features, where determining the optimal alignment including using an iterative process of well log condensing and de-condensing to match peaks and troughs in the first well log data and second well log data.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of UI elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    receiving first well log data associated with a key master well;
    receiving formation data identifying depths of tops of formations confirmed in the key master well;
    generating merged key master well and formation data in a dynamic time warping (DTW)-readable format by merging the first well log data with the formation data;
    identifying a first shallowest formation top using the merged key master well and formation data;
    receiving second well log data associated with a training well located in geographic proximity to the key master well;
    formatting the second well log data into the DTW-readable format;
    identifying a second shallowest formation top using the second well log data;
    normalizing the merged key master well and formation data and the second well log data;
    executing, using the normalized merged key master well and formation data and the formatted second well log data, the first shallowest formation top, and the second shallowest formation top as DTW function inputs, a DTW function to generate indices associated with depths of formation tops, wherein executing the DTW function includes an iterative process of well log condensing and de-condensing to match peaks and troughs in the first well log data and second well log data, the condensing and de-condensing spatially adjust peaks and troughs of formations identified in the first well log data and the second well log data; and
    predicting, using the generated indices, predicted geological formation tops for the training well.

2. The computer-implemented method of claim 1, further comprising outputting the predicted geological formation tops to a file.

3. The computer-implemented method of claim 1, wherein one or both of the first well log data and the second well log data is gamma ray (GR) well log data.

4. The computer-implemented method of claim 1, wherein log files containing the first well log data and the second well log data include entries recorded at depth intervals, and wherein the entries include, at a particular depth, a depth identifier, a resistivity L, a resistivity S, and a spontaneous potential.

5. The computer-implemented method of claim 1, wherein executing the DTW function includes determining an optimal alignment of the first well log data and second well log data.

6. The computer-implemented method of claim 5, wherein determining the optimal alignment including using an iterative process of well log condensing and de-condensing to match peaks and troughs in the first well log data and second well log data.

7. The computer-implemented method of claim 2, further comprising:
    reading the predicted geological formation tops from the file; and
    refining, using the predicted geological formation tops, previously-interpreted geological formation tops in existing wells.

8. A non-transitory, computer-readable medium storing one or more instructions executable by a computer system to perform operations comprising:
    receiving first well log data associated with a key master well;
    receiving formation data identifying depths of tops of formations confirmed in the key master well;
    generating merged key master well and formation data in a dynamic time warping (DTW)-readable format by merging the first well log data with the formation data;
    identifying a first shallowest formation top using the merged key master well and formation data;
    receiving second well log data associated with a training well located in geographic proximity to the key master well;
    formatting the second well log data into the DTW-readable format;
    identifying a second shallowest formation top using the second well log data;
    normalizing the merged key master well and formation data and the second well log data;

executing, using the normalized merged key master well and formation data and the formatted second well log data, the first shallowest formation top, and the second shallowest formation top as DTW function inputs, a DTW function to generate indices associated with depths of formation tops, wherein executing the DTW function includes an iterative process of well log condensing and de-condensing to match peaks and troughs in the first well log data and second well log data, the condensing and de-condensing spatially adjust peaks and troughs of formations identified in the first well log data and the second well log data; and predicting, using the generated indices, predicted geological formation tops for the training well.

9. The non-transitory, computer-readable medium of claim 8, the operations further comprising outputting the predicted geological formation tops to a file.

10. The non-transitory, computer-readable medium of claim 8, wherein one or both of the first well log data and the second well log data is gamma ray (GR) well log data.

11. The non-transitory, computer-readable medium of claim 8, wherein log files containing the first well log data and the second well log data include entries recorded at depth intervals, and wherein the entries include, at a particular depth, a depth identifier, a resistivity L, a resistivity S, and a spontaneous potential.

12. The non-transitory, computer-readable medium of claim 8, wherein executing the DTW function includes determining an optimal alignment of the first well log data and second well log data.

13. The non-transitory, computer-readable medium of claim 12, wherein determining the optimal alignment including using an iterative process of well log condensing and de-condensing to match peaks and troughs in the first well log data and second well log data.

14. The non-transitory, computer-readable medium of claim 9, the operations further comprising:
reading the predicted geological formation tops from the file; and
refining, using the predicted geological formation tops, previously-interpreted geological formation tops in existing wells.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
receiving first well log data associated with a key master well;
receiving formation data identifying depths of tops of formations confirmed in the key master well;
generating merged key master well and formation data in a dynamic time warping (DTW)-readable format by merging the first well log data with the formation data;
identifying a first shallowest formation top using the merged key master well and formation data;
receiving second well log data associated with a training well located in geographic proximity to the key master well;
formatting the second well log data into the DTW-readable format;
identifying a second shallowest formation top using the second well log data;
normalizing the merged key master well and formation data and the second well log data;
executing, using the normalized merged key master well and formation data and the formatted second well log data, the first shallowest formation top, and the second shallowest formation top as DTW function inputs, a DTW function to generate indices associated with depths of formation tops, wherein executing the DTW function includes an iterative process of well log condensing and de-condensing to match peaks and troughs in the first well log data and second well log data, the condensing and de-condensing spatially adjust peaks and troughs of formations identified in the first well log data and the second well log data; and
predicting, using the generated indices, predicted geological formation tops for the training well.

16. The computer-implemented system of claim 15, the operations further comprising outputting the predicted geological formation tops to a file.

17. The computer-implemented system of claim 15, wherein one or both of the first well log data and the second well log data is gamma ray (GR) well log data.

18. The computer-implemented system of claim 15, wherein log files containing the first well log data and the second well log data include entries recorded at depth intervals, and wherein the entries include, at a particular depth, a depth identifier, a resistivity L, a resistivity S, and a spontaneous potential.

19. The computer-implemented system of claim 15, wherein executing the DTW function includes determining an optimal alignment of the first well log data and second well log data.

20. The computer-implemented system of claim 19, wherein determining the optimal alignment including using an iterative process of well log condensing and de-condensing to match peaks and troughs in the first well log data and second well log data.

* * * * *